United States Patent [19]
Olsen

[11] Patent Number: 5,344,705
[45] Date of Patent: Sep. 6, 1994

[54] RETROREFLECTIVE TRANSFER SHEET MATERIAL

[75] Inventor: Ulf N. Olsen, Solbergmoen, Norway

[73] Assignee: Minnesota Mining and Manufacturing Company, St. Paul, Minn.

[21] Appl. No.: 58,155

[22] Filed: May 5, 1993

[51] Int. Cl.⁵ .............................................. B32B 5/16
[52] U.S. Cl. ..................... 428/323; 428/195; 428/204; 428/207; 428/208; 428/402; 428/913
[58] Field of Search ............ 427/535, 137; 428/195, 428/323, 402, 288, 204, 207, 208, 913; 156/276, 230; 359/538; 550/105

[56] References Cited
U.S. PATENT DOCUMENTS

| | | | |
|---|---|---|---|
| 2,143,946 | 1/1939 | Hunter | 41/36 |
| 2,407,680 | 3/1945 | Palmquist et al. | 88/82 |
| 2,422,256 | 6/1947 | Phillippi | 40/135 |
| 2,543,800 | 3/1951 | Palmquist et al. | 88/82 |
| 2,555,715 | 6/1951 | Tatum | 88/82 |
| 2,567,233 | 9/1951 | Palmquist et al. | 88/82 |
| 2,592,882 | 4/1952 | Fisher et al. | 88/82 |
| 3,535,019 | 10/1970 | Longlet et al. | 350/105 |
| 3,551,025 | 12/1970 | Bingham et al. | 350/105 |
| 3,614,199 | 10/1971 | Altman | 350/105 |
| 3,700,305 | 10/1972 | Bingham | 350/105 |
| 3,758,192 | 9/1973 | Bingham | 350/105 |
| 3,836,227 | 9/1974 | Holmen et al. | 350/105 |
| 3,877,786 | 4/1975 | Booras et al. | 350/105 |
| 4,102,562 | 7/1978 | Harper et al. | 350/105 |
| 4,153,412 | 5/1979 | Bailey | 8/2.5 A |
| 4,234,643 | 11/1980 | Grotefend et al. | 428/200 |
| 4,367,920 | 1/1983 | Tung et al. | 350/105 |
| 4,511,210 | 4/1985 | Tung et al. | 350/105 |
| 4,546,042 | 10/1985 | Quon | 428/378 |
| 4,569,857 | 2/1986 | Tung et al. | 427/163 |
| 4,605,461 | 8/1986 | Ogi | 156/233 |
| 4,634,220 | 1/1987 | Hockert et al. | 350/167 |
| 4,656,072 | 4/1987 | Coburn, Jr. et al. | 428/40 |
| 4,721,649 | 1/1988 | Belisle et al. | 428/325 |
| 4,980,216 | 12/1990 | Rompp | 428/90 |
| 5,128,804 | 7/1992 | Lightle et al. | 428/283 |
| 5,207,852 | 5/1993 | Lightle et al. | 156/230 |

FOREIGN PATENT DOCUMENTS

| | | |
|---|---|---|
| 1303103 | 1/1973 | United Kingdom . |
| WO80/00462 | 3/1980 | World Int. Prop. O. . |
| WO88/08793 | 11/1988 | World Int. Prop. O. . |
| WO92/07990 | 5/1992 | World Int. Prop. O. . |

*Primary Examiner*—Patrick J. Ryan
*Assistant Examiner*—William A. Krynski
*Attorney, Agent, or Firm*—Gary L. Griswold; Walter N. Kirn; Richard T. Knauer

[57] ABSTRACT

A transfer sheet material for forming retroreflective graphic images on a substrate, the sheet material comprising a monolayer of transparent microspheres; a color layer printed over the microspheres in a first graphic segment of the sheet material in an imagewise pattern, the color layer comprising a transparent colorant in a transparent resin; a reflective layer printed over the microspheres in a second graphic segment of the sheet material in an imagewise pattern, the reflective layer comprising reflective flakes in a transparent binder, wherein the microspheres are partially embedded in at least one of the color layer and the reflective layer, individual microspheres having the reflective flakes arranged in cup-like fashion about their embedded portions; and a bonding layer printed over the color layer and the reflective layer, the bonding layer being sufficiently thick to embed all exposed surfaces of the color layer and the reflective layer and being adapted for use in securing the sheet material to a substrate. Also, a method for making such a sheet material.

15 Claims, 1 Drawing Sheet

RETROREFLECTIVE TRANSFER SHEET MATERIAL

FIELD OF INVENTION

The present invention relates to retroreflective transfer sheet materials which are useful for forming retroreflective graphic images on substrates and to a process for making such sheet materials.

BACKGROUND

During the growth in popularity of decorative emblems on garments such as T-shirts or jackets, there has been a continuing desire for ways to make such emblems retroreflective. On an outer garment worn at night, such retroreflective emblems would provide a bright return of light to oncoming motorists, thereby adding a safety feature, as well as increased decorative appeal, to the garments.

Insofar as known, no one has previously found a practical or commercially useful way to provide such retroreflective emblems. Some have proposed silk-screening a design onto a garment, and then while the design is still wet, cascading microspheres onto the design; but such an approach is messy, usually provides a nonuniform deposit of microspheres, and is impractical for obtaining high reflective brightness (which requires that the embedded surfaces of the microspheres be covered with a specularly reflective layer). Others have proposed mixing hemispherically specularly-coated glass microspheres into ink and printing such an ink onto the garment (see U.S. Pat. No. 3,535,019 (Longlet et al.)); but while such a product is useful for some purposes, it provides a reduced reflectance because the hemispherically-coated microspheres are randomly oriented within an applied coating. Still others long ago proposed the preparation of retroreflective decals comprising a layer of glass microspheres disposed over a printed design (see U.S. Pat. No. 2,422,256 (Phillippi)); but the suggested decal was a several-layer product which was likely stiff and unsuited for conformable garments.

In the past, the only commercial products suitable for retroreflective emblems or markings on garments have generally been single-colored tapes or sheet materials, with constructions as described in U.S. Pat. Nos. 2,567,233 (Palmquist et al.); 3,551,025 (Bingham et al.); 3,700,305 (Bingham); and 3,758,192 (Bingham). But none of these commercial products is useful to form the complex multi-colored designs that are in fashion and are needed to maximize the use of retroreflective emblems.

U.S. Pat. No. 4,102,562 (Harper et al.) and published International Application No. PCT/DK91/00325 (Publication No. WO 92/07990) disclose retroreflective transfer sheet materials comprising a carrier, a continuous monolayer of transparent microspheres partially embedded in the carrier, a specularly reflective layer (typically a transparent dielectric mirror) deposited onto the exposed surfaces of the microspheres, and a color layer printed over the microsphere layer in an imagewise pattern. In each reference, if the specularly reflective layer is a transparent dielectric mirror, the imagewise pattern or graphic design of the color layer is visible underneath the layer of microspheres in daylight. Although the daytime appearance of the resulting transferred emblem is similar to that obtained with heat transfers that carry no layer of microspheres (i.e., non-reflective transfers), when the emblem is illuminated in a dark room, the light retroreflected from the emblem optically masks the graphic design of the underlying color layer. In other words, only the color of the incident light is typically retroreflected from the emblem since the light is retroreflected directly from the dielectric mirror substantially without contacting the underlying graphic design.

The result is that, in spite of the above-described efforts, multi-colored designs or emblems on garments continue to be made non-retroreflective and the potential use of such emblems for safety purposes goes unrealized.

SUMMARY OF INVENTION

The present invention provides a novel transfer sheet material which is useful for forming retroreflective graphic images on a substrate, including fabrics as well as other substrates. This new transfer sheet material comprises:

a) a monolayer of transparent microspheres, typically preferably closely packed;

b) a color layer printed over the microspheres in a first graphic segment of the sheet material in an imagewise pattern, the color layer comprising a transparent colorant in a transparent resin;

c) a reflective layer printed over the microspheres in a second graphic segment of the sheet material in an imagewise pattern, the reflective layer comprising reflective flakes in a transparent binder, wherein the microspheres are partially embedded in at least one of the color layer and the reflective layer, individual microspheres having the reflective flakes arranged in cup-like fashion about their embedded portions; and d) a bonding layer printed over the color layer and the reflective layer, the bonding layer being sufficiently thick to embed all exposed surfaces of the color layer and the reflective layer and being adapted for use in securing the sheet material to a substrate.

In another of its aspects, the invention relates to a method for making the above-described transfer sheet material, comprising:

a) providing a carrier comprising a base sheet and a heat-softenable layer on the base sheet;

b) cascading a monolayer of transparent microspheres onto the heat-softenable layer and embedding the microspheres in the heat-softenable layer to a depth averaging between about 25 and about 50 percent of their diameters;

c) printing onto the microspheres in a first graphic segment of the sheet material in an imagewise pattern with a colorant composition comprising a transparent colorant in a transparent resin and drying the colorant composition to form a color layer;

d) thereafter printing onto the microspheres in a second graphic segment of the sheet material in an imagewise pattern with a reflective layer composition comprising reflective flakes in a transparent binder and drying the reflective layer composition to form a reflective layer, wherein the microspheres are partially embedded in at least one of the color layer and the reflective layer, individual microspheres having the reflective flakes arranged in cup-like fashion about their embedded portions; and e) thereafter printing onto the first and second graphic segments of the sheet material with a bonding composition to a depth sufficient to embed all exposed surfaces of the color layer and the reflective layer and drying the bonding composition to form a bonding layer and the completed sheet material, the bonding layer being adapted for use in subsequently adhesively bonding the sheet material to a substrate.

Sheet materials of the invention can be used to provide substrates with graphic images comprising non-reflecting colored areas and retroreflective areas, with at least some of the retroreflective areas typically being capable of brilliantly retroreflecting the color of the image provided in these areas. Fabric substrates comprising such transferred graphic images can exhibit good wash durability (i.e., launderability) and can also exhibit good drycleaning durability.

BRIEF DESCRIPTION OF DRAWING

The invention will be further explained with reference to the drawing, wherein.

These figures, which are idealized, are not to scale and are intended to be merely illustrative and nonlimiting.

DETAILED DESCRIPTION OF ILLUSTRATIVE EMBODIMENTS

Figure 1:
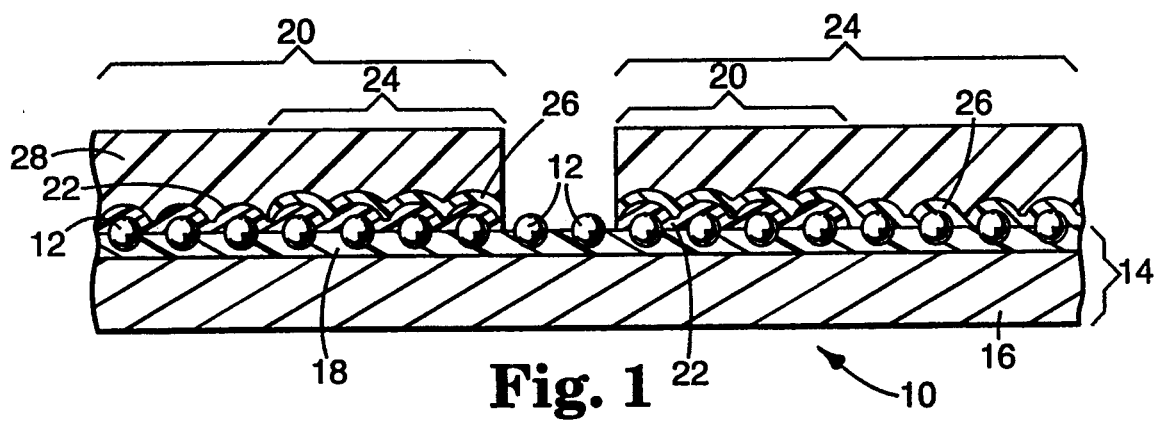
FIG. 1 is an enlarged sectional view through a portion of a retroreflective transfer sheet material of the invention.

A retroreflective transfer sheet material 10 as shown in FIG. 1 can be prepared by cascading a monolayer of transparent microspheres 12 onto a carrier 14 which typically comprises a base sheet 16 and a heat-softenable layer 18. For example, the base sheet 16 can comprise a Kraft paper or a heat-resistant polyester foil, and the heat-softenable layer 18 can comprise a wax, silicone, or rapidly-setting polyolefin such as a low-density polyethylene. The microspheres 12 are typically thermally sunk into the heat-softenable layer 18 to a depth of between about 25 and about 50 percent of their diameters, and preferably between about 40 and about 50 percent of their diameters, by passing the carrier 14 and monolayer of microspheres through a tunnel oven set at a temperature in the range of about 225° to about 300° F. (107° to 149° C.).

The transparent microspheres 12 typically are made of glass and typically have diameters between about 25 and about 150 microns, preferably between about 60 and about 100 microns. Best results are generally obtained when the microspheres have uniform sizes. For best reflective properties, their index of refraction should be about 1.9. The microspheres are preferably as clear as possible.

The sheet material 10 comprises a first graphic segment 20 which can be discontinuous as shown in FIG. 1. In the first graphic segment 20, the exposed surfaces of the microspheres are "printed" with a colorant composition to form a color layer 22. The term "printed" is used throughout this description in a generic sense and is intended to include any specific imagewise coating, spraying, printing, lithographing, screen printing, hand painting, or other suitable application process. In other words, the term "first graphic segment" is intended to denote a segment of the sheet material 10 which is provided with the color layer 22. The color layer 22 is typically formed by screen printing the colorant composition in an imagewise pattern onto the microspheres using a 77 mesh screen.

It is preferred that a 77 mesh screen be used in printing the color layer 22 over the microspheres because portions of the resulting sheet material which are both colored and retroreflective provide a distinct retroreflection of the applied color when this mesh is used. A coarser mesh screen can be used but will result in a thicker color layer, less retroreflection, and a deeper color; whereas a finer mesh screen will result in a thinner color layer, more retroreflection, and a brighter color.

The color layer 22 is usually printed in a reverse image so that a positive image is formed when the sheet material 10 is transferred to a substrate. After the colorant composition is printed onto the microspheres, the colorant composition is dried, typically in an infrared oven at about 120° C. for about 30 seconds, to evaporate the solvent present in the colorant composition.

If desired, the color layer 22 can be formed by successively printing (typically screen printing in an imagewise pattern) and drying a plurality of colorant compositions onto the microspheres in the first graphic segment 20. In other words, the color layer 22 can comprise a number of different colors for each color of a multi-colored design or can comprise a number of differently colored layers to produce an additive or "hybrid" color, each layer being formed by a separately printed and dried colorant composition. For example, if two differently colored colorant compositions are printed in layers which do not overlap, these layers will contribute to a multi-colored design. On the other hand, two differently colored colorant compositions can be printed in layers which do overlap to achieve an additive color. For example, if a sheet material of the invention includes overlapping layers of yellow and blue, these layers will provide a green hue or hybrid color to the sheet material in the area of these layers.

The colorant composition of the color layer 22 typically comprises a "two-component" transparent resin which includes a transparent colorant in the form of a transparent pigment or dye substantially uniformly dispersed in the transparent resin in a concentration sufficient to produce the desired intensity of color. The "first component" is typically in the form of a printable paste which is typically preferably as clear and transparent as possible and can, for example, comprise the following materials:

| Component | Parts by Weight |
| --- | --- |
| Polyvinyl Chloride Acetate | 6 |
| Polyurethane Resin | 15 |
| Transparent Pigment | 9 |
| Ketone Solvent (e.g., Cyclohexanone) | 70 |

The first component is admixed with about 1 to about 5 parts by volume of a suitable hardener, typically an isocyanate hardener such as NB 386, a hexamethylene diisocyanate available from Sericol Group Limited, Westwood Road, Broadstairs, Kent CT10 2PA, England, which serves as the second component. It is also typically important that the second component be as clear and transparent as possible.

It has been discovered that polyurethane-based colorant compositions work well because they adhere well to the rear surfaces of the microspheres and exhibit good stretchability and flexibility, and thus favorably contribute to the durability of sheet materials of the invention.

It is typically desirable to utilize materials in the colorant composition which will not crystallize upon being exposed to temperatures up to about 210° C. since heat is typically used in the above-described drying step and in transferring the sheet material to a substrate (described below).

The viscosity of the colorant composition is important because it is typically desired to have the colorant composition conform to the microspheres. Also, the colorant composition should not flow undesirably so as to result in limited graphic image resolution. The viscosity of the colorant composition can be adjusted as desired by adding a thinner such as a butoxy ethanol to the colorant composition until the desired viscosity is achieved.

After application of the color layer 22, a second graphic segment 24 of the sheet material 10 is provided with a reflective layer 26 disposed behind and printed over the microspheres 12. In other words, the term "second graphic segment" is intended to denote a segment of the sheet material 10 provided with the reflective layer 26. Like the color layer, the reflective layer is typically screen printed in an imagewise pattern and subsequently dried in a similar fashion.

As shown in FIG. 1, both the color layer 22 and the reflective layer 26 can be continuous or discontinuous and can overlap in certain locations or segments and not overlap in other locations. In other words, the first graphic segment 20 and the second graphic segment 24 can be continuous or discontinuous and can overlap in certain locations and not overlap in other locations. In locations where the color layer and the reflective layer overlap, the color layer is disposed between the microspheres and the reflective layer to provide a segment of the sheet material which is capable of retroreflecting the color of the color layer when the microspheres in this segment are illuminated with a beam of incident light.

The reflective layer 26 typically comprises a reflective layer composition comprising a transparent binder which is compatible (i.e., will adhere thereto without causing or undergoing undesirable degradation) with the transparent resin used in the colorant composition and further comprises 15 parts by weight of a powder comprising reflective flakes. An illustrative reflective layer composition is as follows:

| Component | Parts by Weight |
| --- | --- |
| Polyester Resin | 15 |
| Reflective Flake Powder | 15 |
| Ketone Solvent (e.g., Cyclohexanone) | 70 |

The polyester resin can comprise a Nylobag TM or Nylotex TM extender resin available from Sericol Group Limited. Incidentally, it is believed that polyurethane resin could be substituted for the polyester resin although polyester resin is typically used. The reflective flakes will typically be metal flakes, e.g., aluminum, bronze, or gold flakes, although other suitable flakes such as nacreous pigment particles (sometimes called pearlescent pigments) as disclosed in U.S. Pat. No. 3,758,192 (Bingham) may be used if desired.

The above component mixture is admixed with about 1 to about 5 parts by volume of a suitable hardener, typically NB 386 hexamethylene diisocyanate hardener from Sericol Group Limited. Like the colorant composition, it is important that the binder be as clear and transparent as possible.

The reflective flakes are microscopic in that they have a thickness in the range of about 0.03 to about 0.8 microns. Because the reflective flakes are so much smaller than the microspheres, they can generally conform to the surfaces of the microspheres or the contoured surfaces of the color layer. In other words, after printing of the reflective layer, the microspheres are partially embedded in either the color layer or the reflective layer, with certain of the microspheres having reflective flakes arranged in cup-like fashion about their embedded portions. Also, it has been discovered that the reflective flakes have better orientation if the flakes have an ellipsoidal shape rather than a rectangular shape. A suitable aluminum flake powder can be obtained under the trade designation Miral TM 80,000/A/cx/70-30 from A. van Lerberghe, Elleboogstraat 7, 8500 Kortrijk, Belgium.

Figure 2:
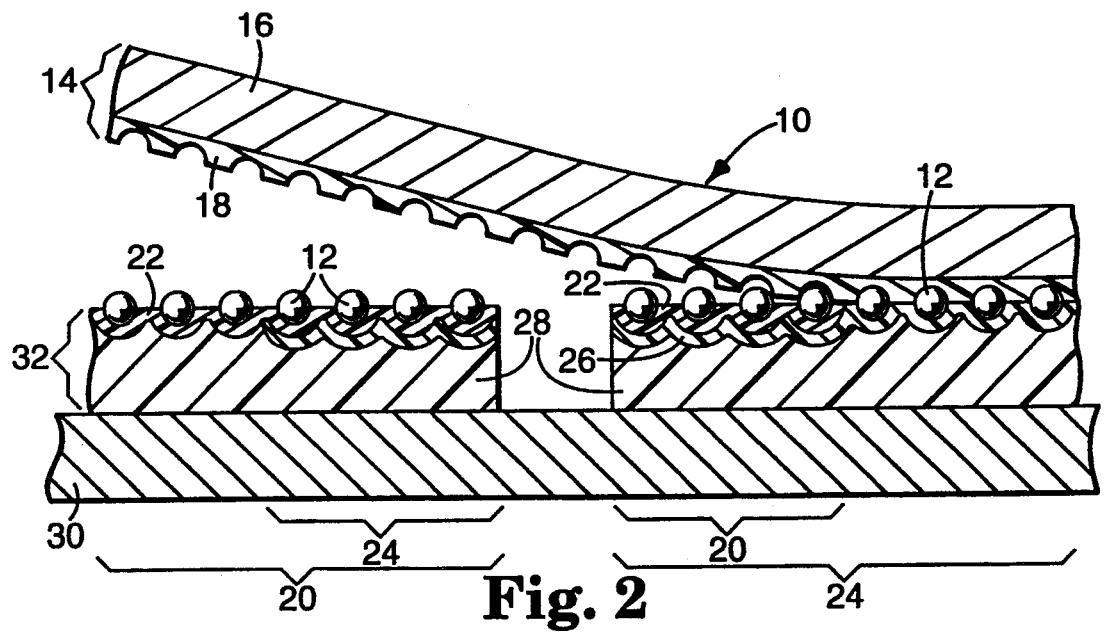
FIG. 2 illustrates schematically in a sectional view the application of a portion of a transfer sheet material of the invention to a substrate.

As shown at the left side of FIG. 1, certain segments of the sheet material 10 are located within the first graphic segment 20 but not within the second graphic segment 24. The microspheres 12 in these segments are printed with the color layer 22 but not the reflective layer 26. These segments of the sheet material have colored graphics but the graphics are not intended to be retroreflective. The color layer 22 and reflective layer 26 are typically printed in layers so thin that neither contains sufficient substance to be capable of bonding the microspheres together and to a substrate. Thus, a relatively thick bonding layer 28 is provided and is adapted for use in bonding the sheet material 10 to a substrate 30 (substrate 30 is shown in FIG. 2). When the sheet material 10 is intended to be used in transferring a design to a fabric substrate, there should typically be enough material in the bonding layer to penetrate the fabric and thereby attach the transferred design to the fabric. The bonding layer 28 also functions to bond the microspheres 12 together. The bonding layer 28 is formed by printing a bonding composition in an imagewise fashion, typically by a screen printing process, over the color layer 22 and the reflective layer 26. Thus, the bonding composition is applied only within the first and second graphic segments, and is not applied in areas of the sheet material located outside of the first and second graphic areas. The bonding composition is printed in an amount which is at least sufficient to embed all exposed surfaces of the color layer 22 and the reflective layer 26 and is subsequently dried in the same fashion as the colorant composition. Typically, the bonding layer 28 has a wet thickness of about 50 to about 100 microns.

The bonding composition preferably comprises an extender resin and an elastomeric, heat-activatable, hot-melt adhesive powder fused into the extender resin. With this preferred type of bonding composition, the extender resin is typically printed in imagewise fashion but the adhesive powder is fused into the extender resin by any suitable process, not necessarily by printing in an imagewise fashion.

The extender resin typically comprises the following components:

| Component | Parts by Weight |
| --- | --- |
| Polyester Resin | 25 |
| Ketone Solvent (e.g., Cyclohexanone) | 75 |

The polyester resin can comprise a Nylobag TM or Nylotex TM extender resin available from Sericol Group Limited. Also, it is believed that polyurethane resin could be substituted for the polyester resin although polyester resin is typically used. The above component mixture is admixed with about 1 to about 5 parts by volume of a suitable hardener, typically an isocyanate hardener such as NB 386 hexamethylene diisocyanate hardener from Sericol Group Limited.

While the applied extender resin is still wet, the elastomeric powder is applied over the surface of the extender resin by any suitable technique known in the art and then fused into the extender resin. This fusing is typically achieved by heating the extender resin and elastomeric powder in an infrared oven at about 130° to about 250° C. for about 10 to about 40 seconds, more preferably at about 150° to about 250° C. for about 20 to about 30 seconds, and most preferably at about 200° C. for about 25 seconds. The powder fuses into the extender resin such that at least some of the powder particles are firmly embedded in the extender resin but also partially exposed at the extender resin surface located opposite the microspheres. These particles promote bonding of the sheet material 10 to the substrate 30.

The elastomeric powder is a fine elastomer granulate which is typically based on polyester or polyamide. Examples of suitable elastomeric powders include a polyamide resin powder which is available under the trade designation FT-409 Transfer Powder from Sericol Group Limited; and a polyester (polydiol dicarboxylate) resin powder which is available under the trade designation Avabond 48E Powder from Imperial Chemical House of London, England.

The elastomeric powder promotes the laundering and drycleaning durability of the transferred image or emblem and increases the likelihood that the bonding layer 28 will be heat-activatable for purposes of heat-transferring the emblem 32 from the sheet material 10 to the substrate 30 even after long-term storage of the sheet material. It has also been found that the elastomeric powder promotes adhesion between the sheet material 10 and textile substrates, thereby allowing the carrier 14 to be stripped off (separated from the color layer 22 and the reflective layer 26) after transferring the image or emblem of the sheet material 10 to a substrate.

Alternatively, it has been found that the extender resin of the bonding composition can be replaced with a transfer glue which is typically a polyester-based glue such as the transfer glue sold by Unitika Aparklite Co. of Japan under the trade designation TR Glue. This transfer glue comprises:

a) 25 parts by weight of a crystalline saturated polyethylene terephthalate resin in powder form having a melting point of 110° C. and available from Toyobo of Japan under the trade designation Vylon TM GN-915P; and b) 75 parts by weight of a saturated polyethylene terephthalate resin in liquid form (50 weight percent saturated polyester resin and 50 weight percent cyclohexanone solvent), the liquid resin having a viscosity of 5,000 centipoise at about 20° C. and being available from Toyobo under the trade designation Vylon TM RV-51CS.

The transfer glue is prepared by adding the crystalline polyester to the liquid polyester while stirring the liquid polyester. The transfer glue has a viscosity of about 90,000 centipoise at about 20° C. and a resin content of about 62.5 weight percent.

Such transfer glues based on polyester do not need a hardener for their function, but they take a somewhat longer time to dry than the above-discussed two-component colorant compositions, reflective layer compositions, and extender resin bonding compositions. For example, the transfer glue is typically dried in an oven at about 50° to about 60° C. for a time of from about 3 to about 5 hours, or at room temperature for several days. Further, these transfer glues can be used without fusing an elastomeric powder into them if no special demands for durability are to be met. However, if the sheet material 10 is to be transferred onto substrates which are typically laundered at temperatures above about 50° C., it will typically be desirable to fuse one of the above elastomeric powders into the transfer glue in the same manner described above in connection with the extender resin.

Referring to FIG. 2, an emblem or design 32 of the completed sheet material 10 can be transferred to the substrate 30 as shown. This drawing figure is a schematic view, as it is contemplated that the bonding layer 28 can bond to the substrate 30 by penetrating through openings in the top surface of the substrate 30, such penetration not being shown in this figure. As seen, all of the emblem 32 is design. The emblem 32 generally comprises the microspheres 12, the color layer 22, the reflective layer 26, and the bonding layer 28. The substrate 30 onto which the emblem 32 is transferred will typically be flexible and comprise a natural or synthetic fabric, such as a cotton, cotton-polyester blend, or nylon, a film, or a nonwoven material.

The transfer is typically accomplished by laying the completed sheet material 10 against the substrate 30 with the bonding layer 28 facing the substrate 30 and placing this assembly in a heat-transfer machine set between about 130° and about 210° C., where pressure is typically applied for between about 10 and about 30 seconds. During this time, the bonding layer 28 softens and typically penetrates into the substrate 30 through openings in the surface of the substrate. The assembly is then permitted to cool so that the bonding layer 28 exhibits a strong adhesion to bond the transferred emblem to the substrate. The carrier 14 can then be peeled back and removed to thereby transfer the emblem 32 onto the substrate 30 as shown in FIG. 2. The microspheres 12 separate from the carrier 14 and are partially exposed with their uncovered surfaces facing outwardly and their embedded surfaces embedded in the color layer 22 or the reflective layer 26.

The result is that retroreflective emblems having the same order of definition of design obtained in non-reflective heat-transferred emblems may be obtained. Multi-colored, intricately patterned designs may be formed, and the designs may be formed with graphic segments which are colored, retroreflective, or both colored and retroreflective. The graphic segments which are both colored and retroreflective can be illuminated with a light beam which brilliantly retroreflects in the color of the underlying graphic design. This brilliant, colored retroreflection occurs because the incident light rays pass through the color layer both before and after being reflected by the reflective layer. The color layer filters the light rays as they pass through the transparent colorant of the color layer, and the filter action produces a color hue in these light rays. Increasing the proportion of colorant in the color layer tends to deepen the color produced, whereas decreasing the proportion of colorant in the color layer weakens the color produced, thereby providing a lighter color hue.

The transfer sheet material 10 is typically very thin so that garment substrates reflectorized with them are of substantially the same conformability or drapability as garments with non-reflective emblems. Also, transfer of emblems from the sheet materials onto garment substrates can be achieved using the same general procedures and equipment already used in the fabric industry.

It is contemplated that the bonding layer 28 could comprise other materials provided the materials retain an imagewise pattern throughout a transfer operation. For example, one such material, a pressure-sensitive adhesive, would have adhesive properties without being heated. If the bonding layer 28 were to comprise such an adhesive, the sheet material 10 would typically include a release liner covering the adhesive surface of the bonding layer.

Figure 3:
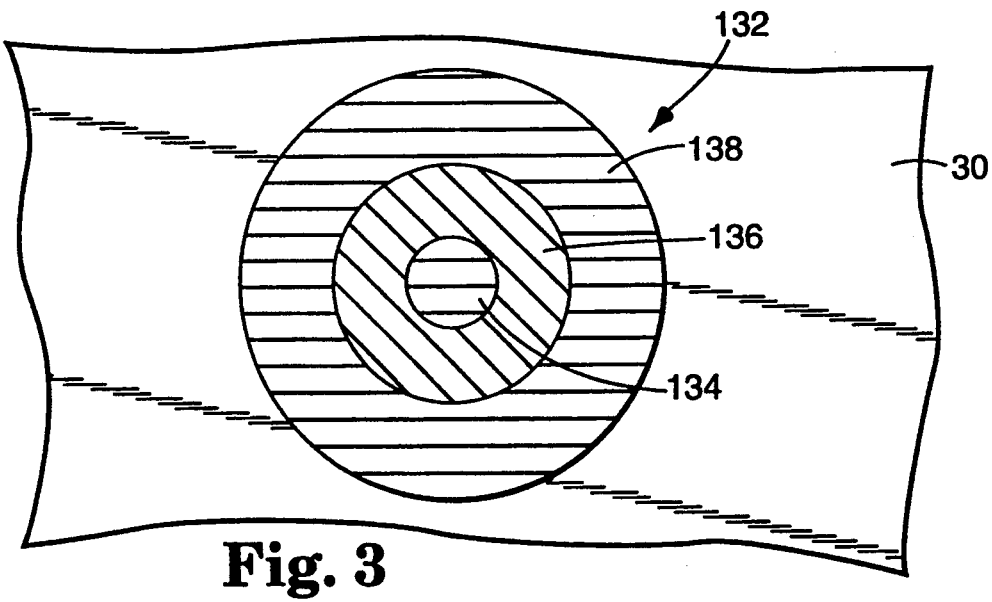
FIG. 3 is a top plan view of an illustrative emblem transferred onto a substrate according to the invention.

A representative transferred design or emblem 132 is illustrated in FIG. 3. This particular emblem 132 is in the form a bull's eye comprising a blue hub 134 in its center, a green doughnut-shaped graphic segment 136 disposed radially outwardly (i.e., concentrically) from the blue hub, and a blue doughnut-shaped graphic segment 138 disposed radially outwardly from the green doughnut-shaped segment.

If a light is illuminated on a segment of the sheet material wherein the first and second graphic segments overlap, light will retroreflect from this segment in such a manner that the underlying colored graphics are also visible and have a brilliant, colored retroreflective appearance. In areas of the sheet material 10 where only one of the first or second graphic segments is provided (i.e., there is no overlapping), either the color layer 22 or the reflective layer 26 will be disposed behind the microspheres 12. If only the color layer 22 is disposed behind the microspheres 12, the graphic design of the color layer in this segment of the sheet material 10 will be visible but will not be retroreflective. If only the reflective layer 26 is disposed behind the microspheres 12, the reflective layer in this segment of the sheet material 10 will have a silvery daytime appearance, and will retroreflect any incident beams of light, but will not be capable of retroreflecting light in a color different from the color of the incident light. If it were desired to produce an emblem comprising only uncolored retroreflecting areas, the sheet material 10 could be provided with no color layer 22 but still be provided with the reflective layer 26.

EXAMPLES

The invention will be further explained by the following illustrative examples which are intended to be nonlimiting. Unless otherwise indicated, all amounts are expressed in parts by weight.

A conveniently sized sheet of a retroreflective transfer sheet material of the invention is positioned on the working surface of a screen printing table so that the transparent microspheres are facing upward. A table which is equipped with a vacuum device for holding the sheet in a desired position is preferred. The screen printing table is fitted with a screen which carries the desired art image: any emulsion used to prepare direct printing screens, such as Advance Direct Photo Emulsion DM 747, is suitable for preparing transfer image screens. When prepared with a 150-200 mesh per inch (60-80 mesh per centimeter) T thread screen, the image should be expected to display the desired range of retroreflective colors. Using standard practices well known to those skilled in the screen printing art, the first of the desired colors of the transfer image is printed through the screen using polyurethane-based inks containing transparent pigments. A typical ink composition would contain:

| | |
|---|---|
| 6% | Polyvinylchloride Acetate |
| 15% | Polyurethane Resin |
| 9% | Transparent Pigment |
| 1-5% | Isocyanate Hardener |

While the first color prints are being prepared, they may be held at ambient conditions until they are all printed, then dried according to the ink manufacturer's directions, if necessary. When the prints with the first color are all dried they may be printed and dried with subsequent colors until all the desired colored portions of the image are complete.

The reflective layer can be printed through a printing screen which bears the transfer image of the portion of the final image which is desired to be retroreflective. A 75-200 mesh screen made with T thread may be used for application of the reflective layer. The reflective layer can be prepared by mixing up to 30% of the reflective flake (such as Miral TM 80000/A/cx/70-30, available from A. van Lerberghe, Elleboogstraat 7, 8500 Kortrijk, Belgium) into a clear extender base resin such as Nylobag TM Extender Base NB-381 (Sericol Group Ltd., Westwood Road, Broadstairs, Kent CT10 2PA, England) with 1-5% of Nylobag TM or Nylotex TM hardener such as NB-386 (Sericol). Depending upon the demands of the image or the climate, the reflective layer formula may be modified to suit with Nylobag TM or Nylotex TM thinner (Sericol Group) and Nylobag TM or Nylotex TM retarder (Sericol). The reflective layer may be allowed to dry by standing at ambient temperature overnight.

The portion of the image which it is desired to transfer to fabric is printed with a bonding layer, such as Sericol Nylobag TM or Nylotex TM extender base (Sericol Group Ltd.) through a 137-150 mesh T thread screen. Immediately after printing and while the image is still wet a dry powder transfer adhesive such as Tubitrans Elastomelt 95F (CHT North America, P.O. Box 467, Lynchburg, Ohio, 45142) is applied to the retroreflective transfer sheet material such that the entire image is uniformly covered with powder transfer adhesive. Excess powdered transfer adhesive is removed from the image areas by gentle shaking, and then the transfer print is allowed to dry at ambient temperature for at least two hours, preferably overnight. After drying, any additional excess powdered transfer adhesive which is not shaken from the image while still wet may be removed by firmly brushing the dry image with a soft brush. The powder transfer adhesive on the surface of the transfer print may be further set by melting. This may be accomplished by passage through a screen printing drying unit equipped with radiant heating at such a speed that only the surface of the image becomes smooth and glossy while no damage is done to the transfer sheet material. One way this may be accomplished is with a Texair Model 30 screen printing oven (American Advance Screen Printing Equipment Company, 400 North Nobel Street, Chicago, Ill., 60622-6383) set at 100° F. (38° C.) forced air, 900° F. (482° C.) radiant, and belt speed No. 1.

The resulting transfer may be transferred to a number of fabric substrates by heat lamination. A Hix Model N-800 heat lamination machine (Hix Corporation, 1201 E. 27th, Pittsburg, Kans., 66762) set at 160° C., 45 pounds (20 kg) feed air pressure, and close time of 12–15 seconds is preferred. After the laminated construction is cooled to room temperature, the liner may be removed to reveal the retroreflective transfer image laminated to the fabric substrate.

Various modifications and alterations of this invention will become apparent to those skilled in the art without departing from the scope and spirit of this invention. For example, while the invention is particularly adapted to retroreflectorization of fabrics and other flexible substrates, and is discussed herein particularly in that context, the invention is also envisioned to be useful in retroreflectorizing other substrates. Further, it is also contemplated that sheet materials of the invention could be used to produce free-standing characters by transferring the design of the sheet material to a temporary substrate, and then removing the design from the temporary substrate by, for example, reheating the substrate to weaken the adhesive strength of the bonding layer.

What is claimed is:

1. A transfer sheet material for forming retroreflective graphic images on a substrate, the sheet material comprising:

a) a monolayer of transparent microspheres;
   b) a color layer printed over the microspheres in a first graphic segment of the sheet material in an imagewise pattern, the color layer comprising a transparent colorant in a transparent resin;
   c) a reflective layer printed over the microspheres in a second graphic segment of the sheet material in an imagewise pattern in such a manner that any overlapping areas of the first and second graphic segments are characterized by the color layer being disposed between the microspheres and the reflective layer, the reflective layer comprising reflective flakes in a transparent binder, wherein the microspheres are partially embedded in at least one of the color layer and the reflective layer, the reflective flakes being small enough relative to the microspheres that individual microspheres have the reflective flakes arranged in cup-like fashion about their embedded portions; and
   d) a bonding layer printed over the color layer and the reflective layer, the bonding layer being sufficiently thick to embed all exposed surfaces of the color layer and the reflective layer and being adapted for use in securing the sheet material to a substrate.

2. The sheet material of claim 1 further comprising a second color layer printed in the first graphic segment in an imagewise pattern, the second color layer comprising a second transparent colorant in a second transparent resin.

3. The sheet material of claim 1 bonded to a substrate through the bonding layer.

4. The sheet material of claim 3 wherein the substrate is a fabric.

5. The sheet material of claim 1 wherein the reflective flakes are selected from the group consisting of metal flakes and nacreous pigment particles.

6. The sheet material of claim 1 wherein the reflective flakes have ellipsoidal shapes.

7. The sheet material of claim 1 wherein the reflective flakes have a thickness in the range of about 0.03 to about 0.8 microns.

8. The sheet material of claim 1 further comprising a carrier comprising a base sheet and a heat-softenable layer on the base sheet, the microspheres being embedded in the heat-softenable layer to a depth averaging between about 25 and about 50 percent of their diameters.

9. The sheet material of claim 8 wherein the microspheres are embedded in the heat-softenable layer to a depth averaging between about 40 and about 50 percent of their diameters.

10. The sheet material of claim 1 wherein the transparent colorant comprises a transparent pigment.

11. The sheet material of claim 1 wherein the transparent resin comprises polyurethane and the transparent binder comprises polyester.

12. The sheet material of claim 1 wherein the color layer and the reflective layer at least partially overlap with the color layer disposed between the microspheres and the reflective layer to provide a segment of the sheet material which is capable of retroreflecting the color of the color layer when the microspheres in this segment are illuminated with a beam of incident light.

13. The sheet material of claim 1 wherein the bonding layer comprises an extender resin and an elastomeric, heat-activatable, hot-melt adhesive powder fused into the extender resin.

14. The sheet material of claim 13 wherein the extender resin comprises polyester.

15. The sheet material of claim 13 wherein the hot-melt adhesive powder comprises an elastomer selected from the group consisting of polyesters and polyamides.

* * * * *

UNITED STATES PATENT AND TRADEMARK OFFICE
CERTIFICATE OF CORRECTION

PATENT NO. : 5,344,705
DATED : September 6, 1994
INVENTOR(S) : Ulf N. Olsen

It is certified that error appears in the above-indentified patent and that said Letters Patent is hereby corrected as shown below:

Col. 7, line 56, "Aparklite" should be --Sparklite--.

Col. 9, line 28, after "form" insert --of--.

Col. 10, line 19, after the line containing "1-5% Isocyanate Hardner" insert --Solvent as required--.

Signed and Sealed this

Twenty-eight Day of February, 1995

Attest:

BRUCE LEHMAN

Attesting Officer     *Commissioner of Patents and Trademarks*